United States Patent
Shelton et al.

(10) Patent No.: US 9,929,594 B2
(45) Date of Patent: Mar. 27, 2018

(54) MODULAR ENERGY STORAGE METHOD AND SYSTEM

(71) Applicant: The AES Corporation, Arlington, VA (US)

(72) Inventors: John C. Shelton, Vienna, VA (US); Jay Geinzer, Glenwood, MD (US); Brett Galura, Falls Church, VA (US); Isaiah Jefferson, Mitchellville, MD (US); Wells Case Jacobson, Jr., Washington, DC (US)

(73) Assignee: THE AES CORPORATION, Arlington, VA (US)

( * ) Notice: Subject to any disclaimer, the term of this patent is extended or adjusted under 35 U.S.C. 154(b) by 189 days.

(21) Appl. No.: 14/721,582

(22) Filed: May 26, 2015

(65) Prior Publication Data
US 2016/0352144 A1   Dec. 1, 2016

(51) Int. Cl.
*H02J 15/00* (2006.01)
*G05B 15/02* (2006.01)
(Continued)

(52) U.S. Cl.
CPC .............. *H02J 15/00* (2013.01); *G05B 15/02* (2013.01); *H02J 3/32* (2013.01); *H02J 9/062* (2013.01)

(58) Field of Classification Search
CPC ... H02J 15/00; H02J 9/062; H02J 3/32; G05B 15/02
See application file for complete search history.

(56) References Cited

U.S. PATENT DOCUMENTS

| 8,558,712 B2 * | 10/2013 | Fechalos | ............. | H01M 10/482 |
| | | | | 320/116 |
| 9,608,451 B2 * | 3/2017 | Sugeno | .................... | H02J 5/00 |

(Continued)

FOREIGN PATENT DOCUMENTS

| EP | 2 506 391 A1 | 10/2012 |
| EP | 2769452 A1 | 8/2014 |

(Continued)

OTHER PUBLICATIONS

Oct. 18, 2016 Extended Search Report issued by European Patent Office in European Application No. 16171170.0 (7 pages).
(Continued)

*Primary Examiner* — Ramesh Patel
(74) *Attorney, Agent, or Firm* — Buchanan Ingersoll & Rooney PC

(57) ABSTRACT

A control subsystem configured to control transferring of power, including: an AC/DC power supply; an uninterruptable power supply; a processor; an Ethernet switch; a first communication interface configured to send and/or receive data from a battery management unit that monitors a storage subsystem including one or more batteries; a first transfer interface configured to transmit power to the storage subsystem; a second communication interface configured to send and/or receive data from a power subsystem that includes a power converter, and the power subsystem is configured to be connected to a power line; and a second transfer interface configured to transmit power to the power subsystem, wherein the processor is configured to send signals which control the charging and discharging of at least one battery of the one or more batteries in the storage subsystem.

26 Claims, 8 Drawing Sheets

(51) Int. Cl.
*H02J 3/32* (2006.01)
*H02J 9/06* (2006.01)

(56) References Cited

U.S. PATENT DOCUMENTS

| | | | |
|---|---|---|---|
| 2008/0303527 A1* | 12/2008 | Fechalos | G01R 31/3606 324/426 |
| 2011/0210614 A1* | 9/2011 | Min | H02J 3/32 307/82 |
| 2011/0298626 A1* | 12/2011 | Fechalos | H01M 10/482 340/664 |
| 2012/0043819 A1 | 2/2012 | Kang et al. | |
| 2012/0173035 A1* | 7/2012 | Abe | H02J 3/00 700/297 |
| 2013/0035802 A1 | 2/2013 | Khaitan et al. | |
| 2013/0049471 A1 | 2/2013 | Oleynik et al. | |
| 2013/0264865 A1* | 10/2013 | Sugeno | H02J 5/00 307/9.1 |
| 2014/0297055 A1* | 10/2014 | Funakubo | G05F 1/66 700/295 |
| 2014/0354234 A1 | 12/2014 | Sudan et al. | |
| 2016/0141894 A1 | 5/2016 | Beaston | |
| 2016/0346922 A1* | 12/2016 | Shelton | B25J 9/162 |
| 2016/0352786 A1* | 12/2016 | Shelton | H02J 7/007 |

FOREIGN PATENT DOCUMENTS

| | | |
|---|---|---|
| RU | 69 341 U1 | 12/2007 |
| WO | WO 2015/048737 | 4/2015 |

OTHER PUBLICATIONS

Chilean Office Action ("Informe Pericial Sobre Solicitud de Patents de Invención") dated Aug. 14, 2017, by the Chilean Patent Office in corresponding Chilean Patent Application No. 2016-01259 and English translation of the Office Action (12 pages).

Official Action dated Dec. 15, 2017 issued by the Patent Office of the Russian Federation in corresponding Russian Patent Application No. 2016120358, and English language translation of Office Action (8 pages).

* cited by examiner

MODULAR ENERGY STORAGE METHOD AND SYSTEM

CROSS-REFERENCE TO RELATED APPLICATIONS

The entire contents of related application entitled "Automated Robotic Battery Tug," U.S. application Ser. No. 14/721,522, filed on May 26, 2015, and related application entitled "Method and System for Self-Registration and Self-Assembly of Electrical Devices," U.S. application Ser. No. 14/721,533, filed on May 26, 2015, are both incorporated by reference herein.

BACKGROUND

The present disclosure is directed to an energy storage product in the form of a battery node system that can be used in a modular manner in an energy storage facility. The energy that is stored in batteries of the storage node can be used in a variety of different scenarios, including applications such as peak-shaving, emergency power, and system stability control with duty cycles ranging from seconds to several hours.

SUMMARY

A control subsystem configured to control transferring of power, including: an AC/DC power supply; an uninterruptable power supply; a processor; an Ethernet switch; a first communication interface configured to send and/or receive data from a storage subsystem that one or more batteries; a first transfer interface configured to transmit power to the storage subsystem; a second communication interface configured to send and/or receive data from a power subsystem that includes a power converter, and the power subsystem is configured to be connected to a power line; and a second transfer interface configured to transmit power to the power subsystem, wherein the processor is configured to send signals which control the charging and discharging of at least one battery of the one or more batteries in the storage subsystem.

A power storage and distribution system, including: a node that includes: a storage subsystem, a control subsystem, and a power subsystem; the storage subsystem includes one or more batteries which are removable and chargeable and/or dischargeable, and the storage subsystem includes a processor that is configured to monitor at least one battery of the one or more batteries, and is configured to communicate with the control subsystem; the power subsystem is configured to be connected to a power line, and the power subsystem includes a power converter which converts AC power to DC power when the at least one battery is being charged, and converts DC power to AC power when the at least one battery is being discharged; and the control subsystem is connected to the storage subsystem and is connected to the power subsystem, the control subsystem includes a processor, and the processor is configured to control transferring of power between the battery management unit and the power subsystem, wherein the processor is configured to send signals which control the charging and discharging of the at least one battery, and wherein the processor is configured to monitor an operational status of the one or more batteries.

A power storage and distribution system, including: a plurality of nodes, each node including: a storage subsystem, a control subsystem, and a power subsystem; the storage subsystem includes one or more batteries which are removable and chargeable, and the storage subsystem includes a processor that is configured to monitor at least one battery of the one or more batteries, and is configured to communicate with the control subsystem; the power subsystem is configured to be connected to a power line, and the power subsystem includes a power converter which converts AC power to DC power when the at least one battery is charged, and converts DC power to AC power when the at least one battery is discharged; the control subsystem is connected to the storage subsystem and is connected to the power subsystem, the control subsystem includes a processor, and the processor is configured to control transferring of power between the storage subsystem and the power subsystem, wherein the processor is configured to send signals which control the charging and discharging of the at least one battery, and wherein the processor is configured to monitor an operational status of the one or more batteries; and a unit control subsystem connected to each of the plurality of nodes, and the unit control subsystem is configured to monitor a current state of the plurality of nodes.

These and other features and advantages of particular embodiments of the node based unit energy storage method and system will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Figure 1:
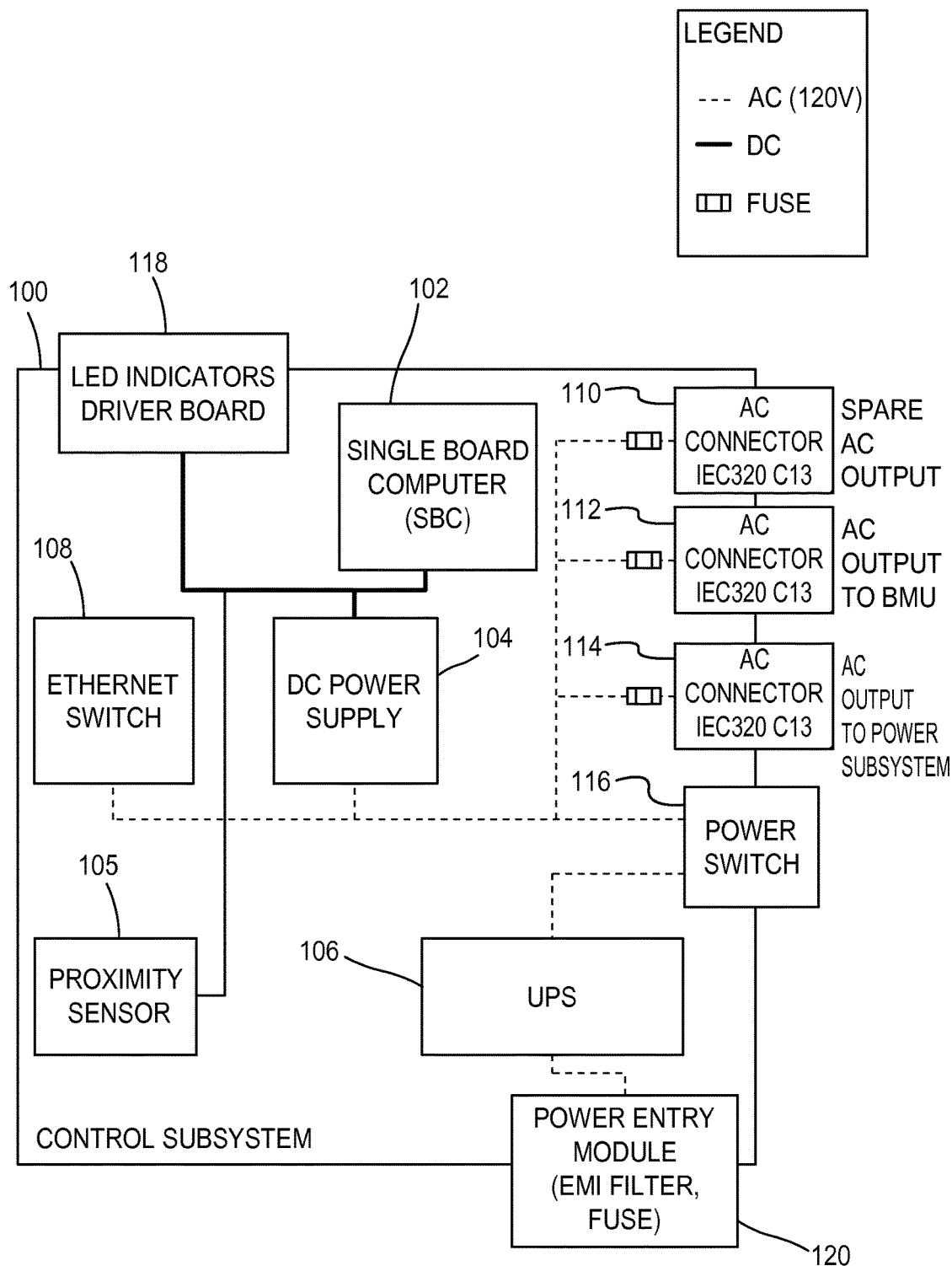
FIG. 1 illustrates a hardware architecture of the control subsystem in accordance with an exemplary embodiment.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the node based unit energy storage method and system. Rather, the ensuing description of the embodiments will provide those skilled in the art with an enabling description for implementing embodiments of the node based unit energy storage method and system. Various changes may be made in the function and arrangement of elements without departing from the spirit and scope of the system and method as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

1. Node Control Subsystem Architecture

A. Electrical Connections of the Components Located within the Node Control Subsystem A control subsystem 100 is a control unit that interfaces with a power subsystem 408 and a storage subsystem 434 that includes a battery management unit 404 and at least one battery 406. The control subsystem 100, the power subsystem 408, and the storage subsystem 434 comprise a power unit called a node 410. A node will be explained in greater detail later. The control subsystem 100 can send signals to the power subsystem 408 and the battery management unit 404 which bring about the charging or discharging of a battery or batteries 406 by components in the power subsystem 408. The battery management unit 404 can connect and disconnect the batteries 406 in the storage subsystem 434. The control subsystem 100 can monitor/manage the current state, health (e.g. long-term and short-term), and/or performance (e.g. long-term and short-term) of the batteries and/or other components in the power storage system. The current state and health parameters will be discussed in greater detail later.

FIG. 1 shows a control subsystem 100, and the electrical connections of various components located within the control subsystem 100. As shown in the legend of FIG. 1, a broken line denotes an alternating current (AC) line of, for example 120V. It is possible that the AC voltage could be any other voltage than 120V. Also, in FIG. 1, a solid line denotes a direct current (DC) line. It is possible for AC lines to instead be DC lines, and for the DC lines to instead be AC lines. It is also possible for all of the lines in FIG. 1 to be all AC lines or all DC lines, or any combination of AC lines and DC lines.

The control subsystem 100 is configured to control transferring of power. The control subsystem 100 includes: an AC/DC power supply 104 (e.g., a DC power supply as in FIG. 1); an uninterruptable power supply (UPS) 106; a processor 102; an Ethernet switch 108; a power switch 116; and a power entry module 120 (EMI filter, fuse, etc.). The processor 102 could be any type of computer processor, including a single board computer, etc. For example, the processor 102 can be a single processor, a plurality of processors, or combinations thereof. The processor 102 may have one or more processor "cores." The single board computer can be, for example, a Raspberry Pi single board computer. The single board computer can include, for example, a 32-bit processor with an ARM or x86 core architecture. In an exemplary embodiment, the single board computer can use a MathWorks, Inc. embedded code supported processor. In an exemplary embodiment, the single board computer can include a memory having a capacity of 512 MB or more. Alternatively, the storage capacity of the memory of the single board computer can be any size. The memory could be a RAM, ROM, etc. In an exemplary embodiment, the software of the control subsystem 100 can be stored outside of the control subsystem 100.

The Ethernet switch 108 can be, for example, a 10/100 Mbps or faster Ethernet controller. The Ethernet switch 108 can have any number of ports, for example, at least five ports. A first port for the single board computer 102, a second port for the uninterruptable power supply 106, a third port for the battery management unit 404 located (shown in FIG. 5) in the storage subsystem 434, a fourth port for the power subsystem 408, and a fifth port for an upstream network connection.

The control subsystem 100 also includes a first communication interface 216 configured to send and/or receive data from a storage subsystem 434 that monitors one or more batteries 406 that are removable and chargeable.

The batteries can be any type of battery, including rechargeable batteries (e.g., flow battery, fuel cell, lead-acid, lithium air, lithium-ion, molten salt, nickel-cadmium (NiCd), nickel hydrogen, nickel-iron, nickel metal hydride, nickel-zinc, organic radical, polymer-based, polysulfide bromide, potassium-ion, rechargeable alkaline, silicon air, sodium-ion, sodium-sulfur, super iron, zinc-bromine, zinc matrix, etc.) and/or non-rechargeable batteries (e.g., alkaline, aluminum-air, atomic, Bunsen cell, chromic acid cell, Clark cell, Daniell cell, dry cell, earth, frog, galvanic cell, grove cell, Leclanche cell, lemon, lithium, lithium air, mercury, molten salt, nickel oxyhydroxide, organic radical, paper, potato, Pulvermacher's chain, reserve, silver-oxide, solid-state, voltaic, water-activated, Weston cell, zinc-air, zinc-carbon, zinc chloride, etc.). The storage subsystem 434 can include only one type of battery or a combination of different types of batteries.

Figure 2:
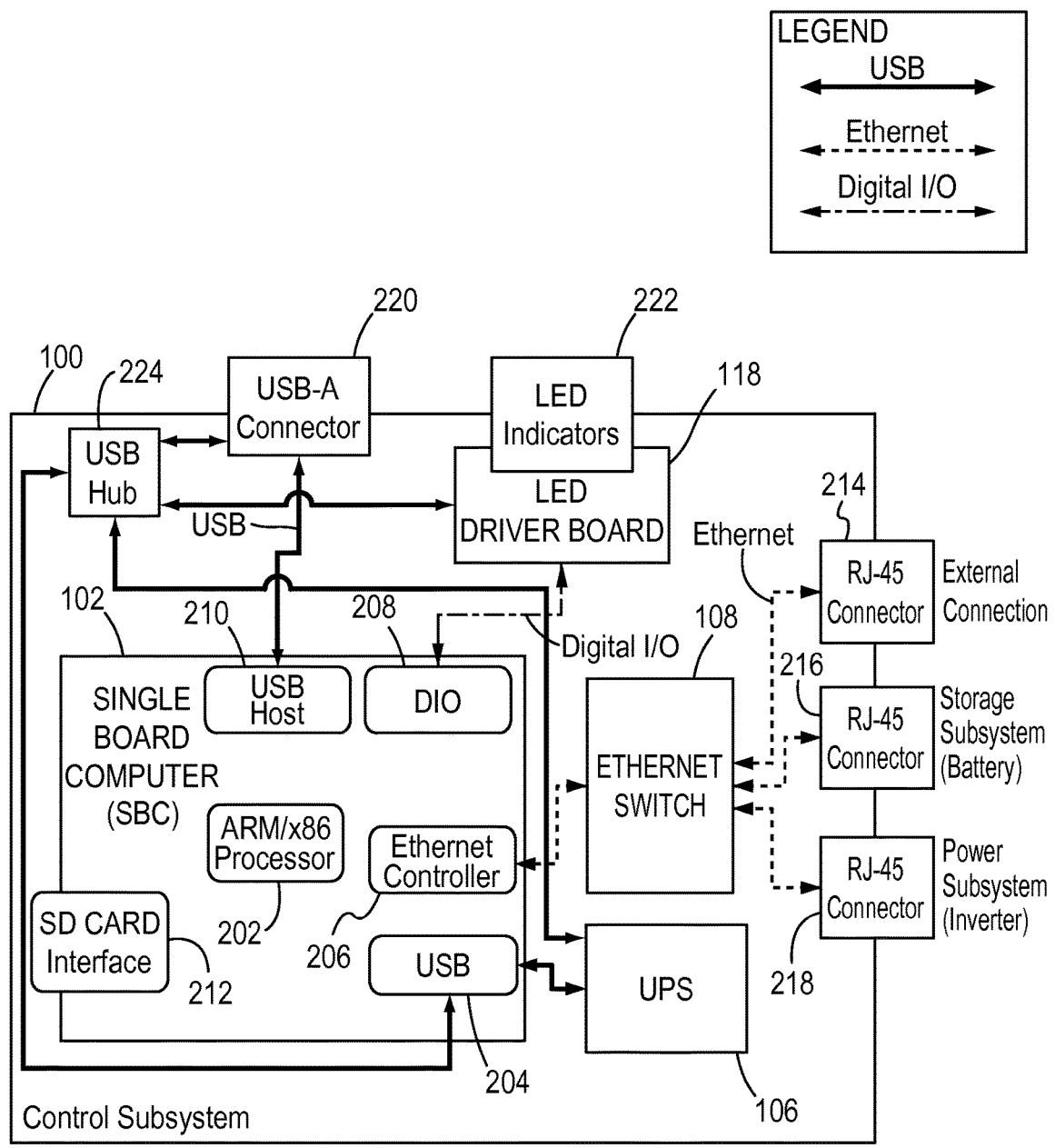
FIG. 2 illustrates a hardware architecture of the control subsystem in accordance with an exemplary embodiment.

The first communication interface 216 can be, for example, a RJ-45 connector as shown in FIG. 2. The first communication interface can also be any other type of data connector and may consist of one or more connectors.

The control subsystem 100 also includes a first transfer interface 112 configured to transmit power to the battery management unit 404. For example, the transmitted power can be control and/or auxiliary power. The first transfer interface 112 can be, for example, an AC connector IEC320 C13 as shown in FIG. 1. The first transfer interface 112 can also be any other type of data connector and may include one or more connectors.

Figure 8:
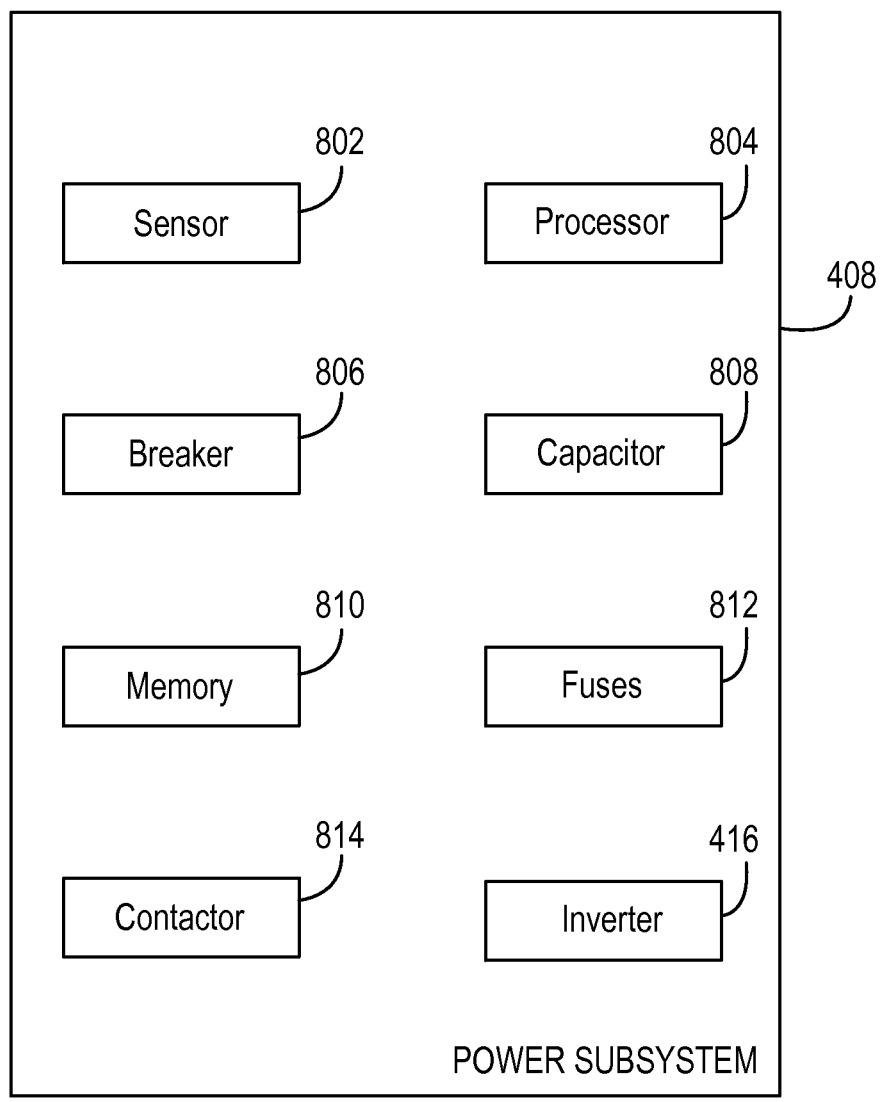
FIG. 8 illustrates a hardware architecture of the power subsystem in accordance with an exemplary embodiment.

The control subsystem 100 also includes a second communication interface 218 configured to send and/or receive data from a power subsystem 408. The second communication interface 218 can be, for example, a RJ-45 connector as shown in FIG. 2. The second communication interface 218 can also be any other type of data connector and may include one or more connectors. The control subsystem 100 also includes a spare AC output connector 110 which can be, for example, an AC connector IEC320 C13. The power subsystem 408, shown in FIG. 4, includes a power converter 416, and the power subsystem 408 is configured to be connected to a power line. The power converter 416 can be an AC or DC inverter, the inverter has the ability to connect or disconnect itself. An exemplary embodiment of the power subsystem 408 is shown in FIG. 8. In addition to the power converter 416, the power subsystem 408 can include, for example, at least one sensor 802, at least one processor 804, at least one breaker 806, at least one capacitor 808, at least one memory 810, at least one fuse 812, and at least one contactor 814.

In an exemplary embodiment, the control subsystem 100 can include a third communication interface and/or control power interfaces for a power meter used to measure one or more of: voltage, current, and power quality.

The control subsystem 100 of FIG. 1 also includes a second transfer interface 114 that is configured to transmit power to the power subsystem 408. For example, the transmitted power can be control and/or auxiliary power. The second transfer interface 114 can be, for example, an AC connector IEC320 C13 as shown in FIG. 1. The second transfer interface 114 can also be any other type of data connector and may include one or more connectors. In an exemplary embodiment, one or more of the first transfer interface 112, the second transfer interface 114, and the spare AC output connector 110 may not be powered by the uninterruptable power supply 106.

The processor 102 is configured to send signals which control the charging and discharging of at least one battery 406 in the storage subsystem 434. The control subsystem 100 is used to coordinate power transfer between the storage subsystem 434 and the power subsystem 408. The power subsystem 408 is responsible for pulling power from the grid and transferring it to the battery or batteries 406. The power system 408 can also pull power from the battery or batteries and transfer it to the grid.

Figure 5:
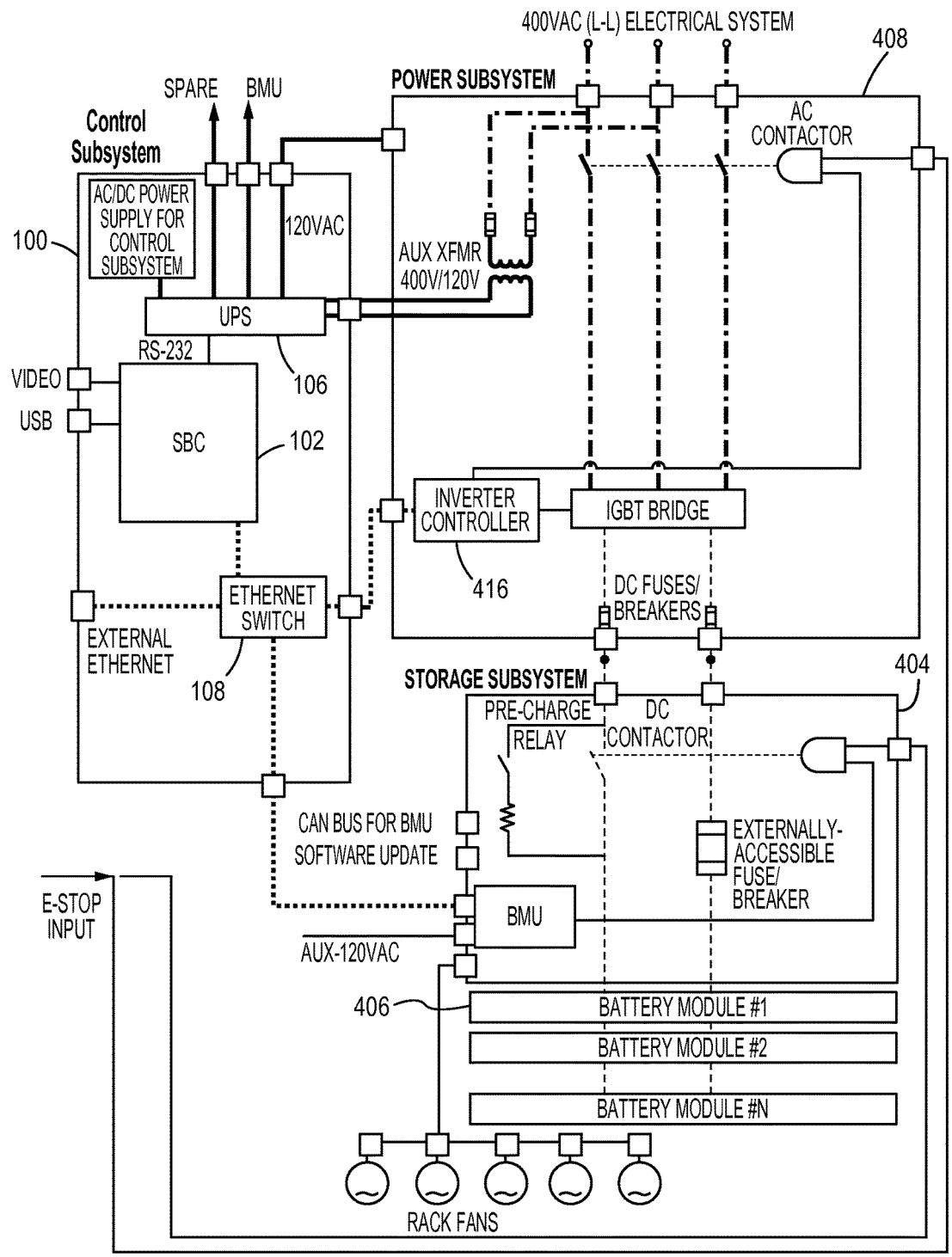
FIG. 5 illustrates interconnections of components in a node in accordance with an exemplary embodiment.

The uninterruptable power supply 106, shown in FIG. 1, provides temporary 120V AC power in the event of disconnection of the control subsystem 100 from facility power lines. The uninterruptable power supply 106 can supply, for example, 250 W at 120V AC, under both a normal state (i.e., external 120V AC available) and a power loss state (i.e., no external 120V AC available, running from batteries). The uninterruptable power supply 106 can supply temporary power at any other voltage or power level. As shown in FIG. 5, the uninterruptable power supply 106 can provide power to the power subsystem 408 module and to a battery management unit (BMU) 404 (i.e. a computer processor) of the power subsystem 434. The battery management unit 404 tells the power subsystem 408 when it can control (for example, charge or discharge) the battery or batteries 406. The uninterruptable power supply 106 can, for example, have sufficient capacity to provide at least five minutes of 120V AC, 250 W output operation under power loss conditions. The uninterruptable power supply 106 can also include protective devices (fuses, breakers, etc.) for each 120V AC output terminal of the uninterruptable power supply 106.

The control subsystem 100 of FIG. 1 also includes a proximity sensor 105 configured to sense a person or object in the vicinity of the control subsystem 100, and when a person or object is sensed in the vicinity of the control subsystem 100, the behavior of the control subsystem 100 is modified. For example, a person or robot can be sensed when the person or robot is located several feet (e.g. 1-10 feet) in front of the proximity sensor. Also, when the proximity sensor 105 senses a person or object in a vicinity of the node 410, and when a person or object is sensed in the vicinity of the node 410, the behavior of the node 410, control subsystem 100, storage subsystem 434, or power subsystem 408 is modified. In an exemplary embodiment, the behavior of the node 410 can be modified by the node powering down or going offline so maintenance can be performed. The behavior of one, some, or all of the control subsystem 100, storage subsystem 434, or power subsystem 408 can be modified so that maintenance operations can be performed, e.g. adding batteries or power storage to the storage subsystem 434, etc. In an exemplary embodiment, the behavior of the node 410 or the control subsystem 100 can be modified by the node 410 or the control subsystem 100 emitting a signal (e.g., noise, light, etc.) when the person or robot passes by the node 410 to help the person or robot identify the particular node 410 emitting the signal. This feature could allow a maintenance person to easily identify a node 410 that needs maintenance, or some other action to be performed, among a plurality of other nodes 410.

Figure 7:
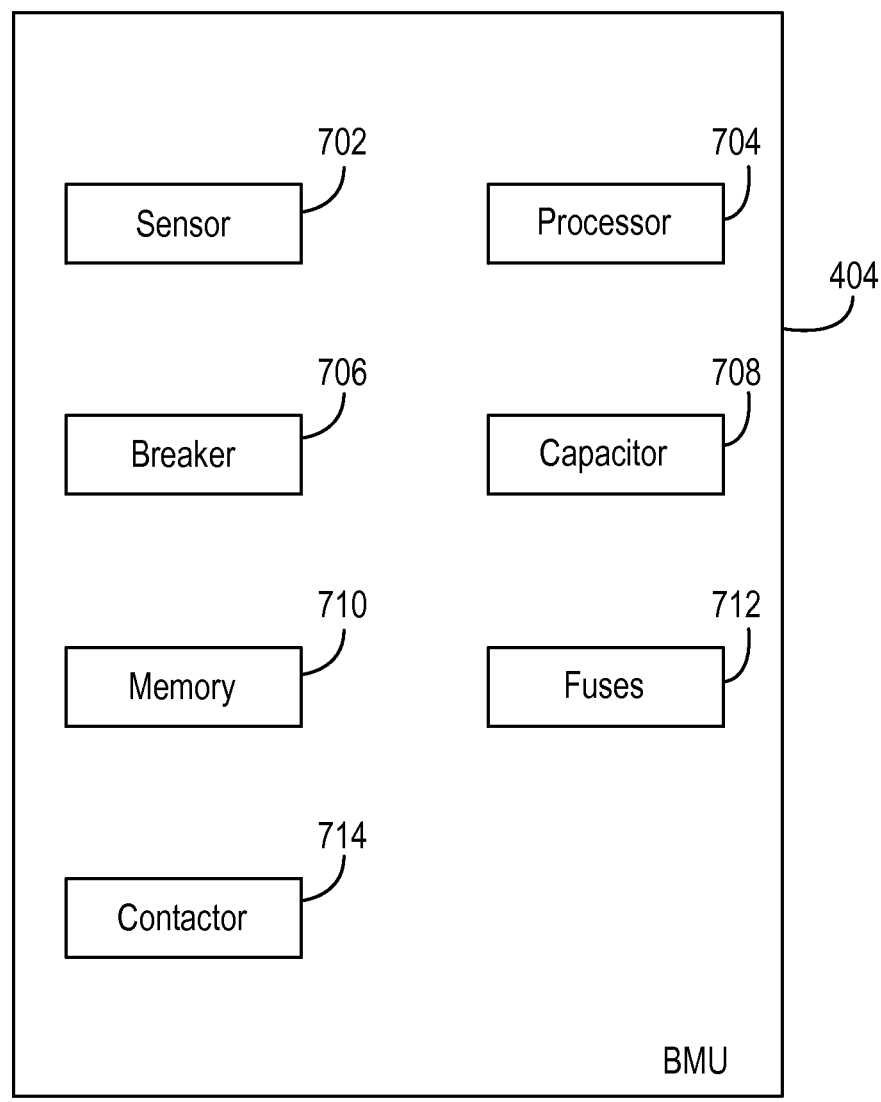
FIG. 7 illustrates a hardware architecture of the battery management unit in accordance with an exemplary embodiment.

An exemplary embodiment of the battery management unit 404 is shown in FIG. 7. The battery management unit 404 can include, for example, at least one sensor 702, at least one processor 704, at least one breaker 706, at least one capacitor 708, at least one memory 710, at least one fuse 712, and at least one contactor 714.

The AC/DC power supply 104 provides power to the components of the control subsystem 100 and is sized to provide continuous operation of the components. The control subsystem 100 is used to coordinate interactions between the storage subsystem 434 and the power subsystem 408, and to control overall operational functions of a node 410a, 410b, 410c, etc. including charging, discharging, DC idle, safe shutdown, and emergency modes.

In an exemplary embodiment, the processor 102 receives battery data from the battery management unit 404, and based on information in the received battery data, the processor 102 instructs the power subsystem 408 to control (for example, charge or discharge) the at least one battery 406. The battery data can indicate a charge level of batteries managed by the battery management unit 404, indicate faults/status of the batteries, performance parameters, health parameters, etc. Performance and health parameters will be discussed in greater detail below. The processor 102 can also instruct the storage subsystem 434 to take an action as required for charge or discharge, for example connecting or disconnecting (in the case of stopping/preventing charging or discharging) The processor 102 can also instruct the storage subsystem 434 to perform self-maintenance. Also, performance of the system optimized by selecting and using batteries or nodes that are best suited for a particular application (e.g., short duration and high power vs. long duration and high energy, amount of power available from the node, current capabilities, cost of use of the stored energy, cost of the associated degradation of the batteries, etc.).

In an exemplary embodiment, the processor 102 is configured to optimize health and performance of the one or more batteries 406 in the storage subsystem 434. The health and performance of the one or more batteries 406 can be long-term health and performance or short-term health and performance. Parameters that indicate the current status, the performance, or the short-term/long-term health of the batteries, may include all or some of the following:

current state/status of the node 410 (e.g., whether it is online/offline, the current mode, errors that have occurred and/or are present, etc.); power subsystem 408 temperature (e.g. minimum temperature, maximum temperature, average minimum temperature, average maximum temperature, etc.);

power subsystem 408 temperature exposure (e.g. number of times of X degrees for Y amount of time, etc.);

battery temperature (e.g. minimum temperature, maximum temperature, average minimum temperature, average maximum temperature, etc.);

battery temperature exposure (e.g. number of times of X degrees for Y amount of time, etc.);

age of the batteries (e.g. average age of the batteries, etc.);

most efficient dispatch range of the batteries, possible dispatch range of the batteries, current dispatch range of the batteries, etc.;

state of charge (SoC) of the batteries (e.g., average SoC);

throughput (e.g., average throughput);

capacity (e.g. charge/discharge);
time since last dispatch;
cell voltage (e.g., minimum and/or maximum at the rack level, etc.);
charge rate (C-rate);
full cycle equivalents number;
warranty information of the batteries;
efficiency curve of the batteries;
the maximum efficiency of the inverter; and
life of the components, etc.

Some or all of the above status/health parameters can be used to optimize performance and/or health of the batteries. In an exemplary embodiment, the processor 102 is configured to monitor an operational status of the one or more batteries 406. The operational status could indicate a fault, charging of the storage subsystem 434, discharging of the storage subsystem 434, percentage of power available, etc. In a non-limiting embodiment, the performance of one or more batteries, a node, and a plurality of nodes can be optimized by taking into account the amount of time to warranty expiration, distributed usage among batteries, nodes, power nodes (e.g., for even use of the nodes to ensure that a particular node is not overused).

Figure 4:
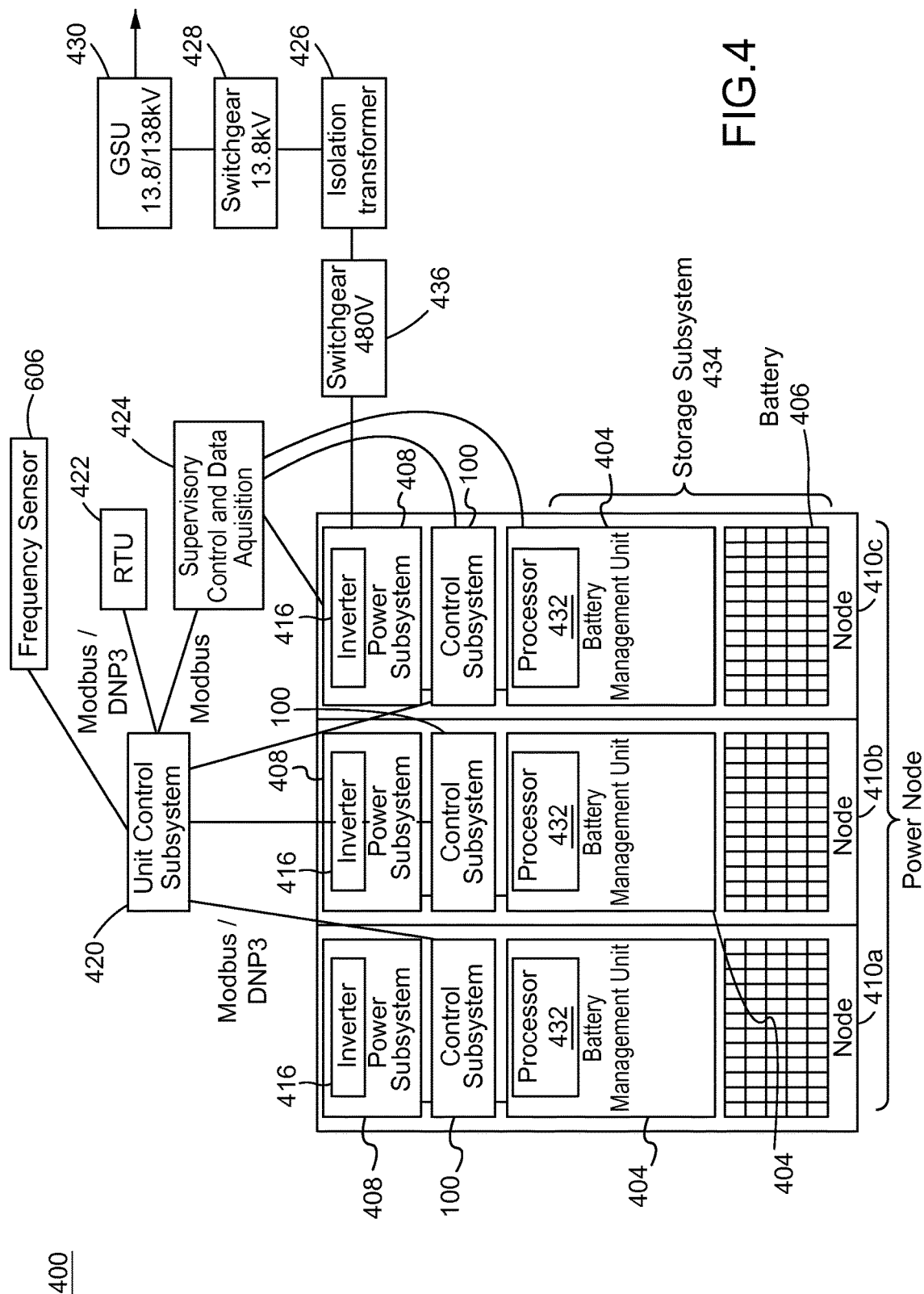
FIG. 4 illustrates a power system architecture in accordance with an exemplary embodiment.

FIG. 4 shows three exemplary nodes 410a, 410b, 410c. Each node 410a, 410b, 410c can include a storage subsystem 434 that includes at least one battery 406 and a battery management unit 404 that includes a processor 432; a control subsystem 100; and a power subsystem 408 including a power converter 416, such as an inverter. In an exemplary embodiment, the components of the node (the control subsystem 100, the power subsystem 408, and the storage subsystem 434) are configured to be mounted to a rack. In an exemplary embodiment, the storage rack conforms to at least one of ETSI, EIA, IEC, CEA, DIN, or similar rack standards. However, the components of a node could be located within a container, vessel, etc. and do not need to be mounted to a rack. Also, a node could be comprised of one rack of components or multiple racks of components. FIG. 4 shows that a node includes one storage subsystem 434, one control subsystem 100, and one power subsystem 408; however, a node could contain any number of subsystems. For example, a node could contain multiple storage subsystems, multiple power subsystems 408, and multiple control subsystems 100. Also, in an exemplary embodiment, the node could include another subsystem other than the control subsystem 100, the storage subsystem 434, and the power subsystem 408, e.g., a reactive power subsystem or a power generation subsystem. In another exemplary embodiment, the node would not include a power subsystem 408 that includes batteries, as a node does not have to include a power subsystem.

Figure 3:
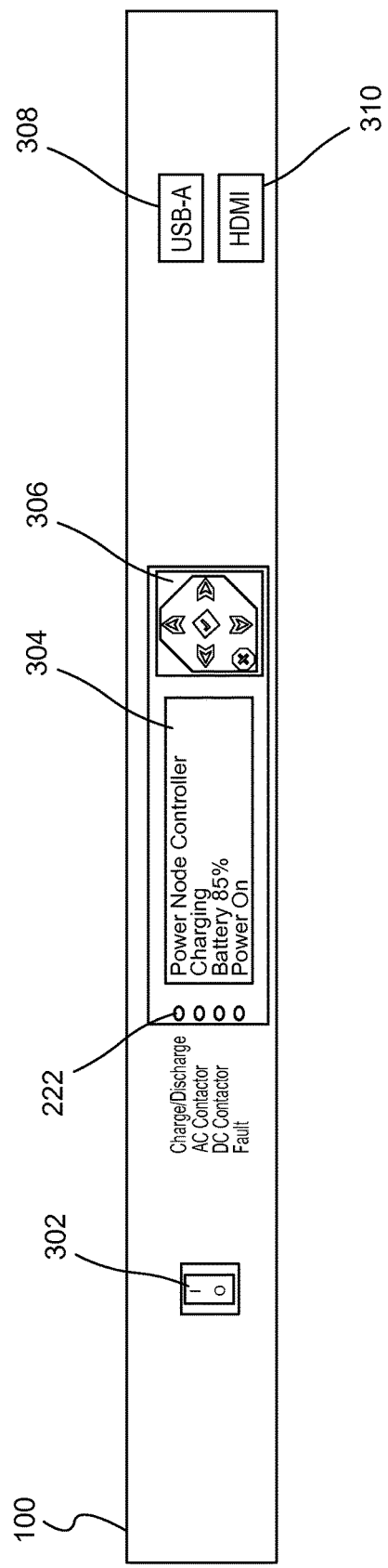
FIG. 3 illustrates a front panel of the control subsystem in accordance with an exemplary embodiment.

In an exemplary embodiment shown in FIG. 1, the control subsystem 100 includes an indicator, for example an LED driver board 118 configured to control a plurality of LEDs 222 which indicate the status of the control subsystem 100 and/or the energy storage node 410. For example, in FIG. 3, the plurality of LEDs 222 can indicate charge or discharge, AC contactor status, DC contactor status, and a fault. The control subsystem 100 can include an LCD driver board instead of the LED driver board 118 or in addition to the LED driver board 118. For example, FIG. 3 shows a LCD screen that is controlled by an LCD driver board. Also, the indicator can be any type of device capable of indicating the status of the control subsystem and/or the energy storage node 410.

B. Data Connections of the Components Located within the Node Control Subsystem

FIG. 2 shows the control subsystem 100, and the data connections of various components located within the control subsystem 100. In FIG. 2, the USB connector 220 is connected to USB host 210 in the single board computer 102 via a USB connection. The single board computer 102 also includes a digital I/O module 208 that is connected to an LED driver board 118 via a digital I/O connection. The LED driver board 118 controls LED indicators 222 which output status information regarding the control subsystem 100 and/or the node 410a. In an exemplary embodiment, the total power required during normal operation and during power up by the control subsystem 100 is less than 80 W. In another exemplary embodiment, the control subsystem 100 is able to perform a power cycle of the uninterruptable power supply 106 output.

FIG. 2 also shows a USB module 204 that is connected to the uninterruptable power supply 106 via a USB connection. The single board computer 102 also includes an Ethernet controller 206 that is connected (for example via an Ethernet connection) to an Ethernet switch 108 that is located outside of the single board computer or processor 102. The Ethernet switch 108 is connected to each of the connectors 214, 216, and 218 via separate Ethernet lines.

In an exemplary embodiment, the control subsystem 100 includes a port that allows the processor 102 to be programmed or reprogrammed. For example, the port could be a USB port 220 (USB 2.0, USB 3.0, etc.) as shown in FIG. 2. The port can be any other data port that receives and/or transmits data, e.g., RS-232, Ethernet port, etc. Instead of a physical port 220 or in addition to the physical port 220, the processor 102 could be programmed or reprogrammed remotely via Wi-Fi, NFC, etc.

In an exemplary embodiment, the control subsystem 100 includes an SD card interface 212 configured to accept an SD card. The interface 212 could instead accept an SDHC or a micro SD card, etc. The SD card preferably stores 4 GB or more of data. The single board computer 102 could include any other type of memory device (RAM, ROM, hard drive, optical drive, etc.) other than the SD card interface 212 and the SD card.

The exemplary control subsystem 100 of FIG. 2 can also include a USB hub 224 that is connected to the USB-A connector 220, the UPS 106, the LED driver board 118, and the USB module 204 via USB connections. The digital I/O and USB connections shown in FIG. 2 are interchangeable.

C. Front Panel of the Node Control Subsystem

FIG. 3 shows an exemplary embodiment of a front panel of a control subsystem 100 used, for example, to control a node. The front panel includes a power on/off switch 302. The power on/off switch 302 can be a mechanical switch or a membrane switch. The power on/off switch 302 allows all 120V AC output power from the uninterruptable power supply 106 to be interrupted. Thus, the power on/off switch 302 can allow all 120V AC power to be cut for resetting the control subsystem 100, the power subsystem 408, and the storage subsystem 434 for servicing/installation.

FIG. 3 shows a plurality of LEDs 222 that are visual status indicators that indicate, for example, power status, charging/discharging status, battery charge status, AC contactor status, DC contactor status, fault/error status, etc. The power status indicator can indicate the presence of AC power at the uninterruptable power supply 106 output. The charging/discharging status indicator can be a bicolor LED in which one color indicates charging and the other color indicates discharging. Also, the AC contactor status indicator can be a bicolor LED in which one color indicates that the AC contactor is open and the other color indicates that the AC contactor is closed. Similarly, the DC contactor status indicator can be a bicolor LED in which one color indicates that the DC contactor is open and the other color indicates that the DC contactor is closed.

FIG. 3 also shows a LCD screen 304 that displays additional status information. For example, in FIG. 3, the LCD screen 304 indicates that the control subsystem 100 is operating as a power node controller, i.e. that it is monitoring the components of a node, e.g., the components contained in one storage rack. The LCD screen 304 also displays that the batteries are charging and what the current percentage of available battery power is. Lastly, the LCD screen 304 indicates that power is on. FIG. 3 also contains a plurality of keys 306 that can be pressed in order to navigate through menus or information displayed on the LCD screen 304. FIG. 3 also shows a port 308 (e.g. USB-A port) that is located on the front panel of the control subsystem 100. This port 308 can be the same as port 220 shown in FIG. 2 or a different port. FIG. 3 also shows an HDMI port 310 that is located on the front panel of the control subsystem 100. In an exemplary embodiment, the HDMI port 310 can be used to output video data, which includes various operating parameters, to a display device such as a LCD screen, etc. In another exemplary embodiment, the HDMI port 310 can be used to program or reprogram the processor 102.

2. Power Node System Architecture

FIG. 4 illustrates a power node system that includes three node systems 410a, 410b, 410c. The multiple nodes 410a, 410b, 410c form a unit or entity which will hereinafter be referred to as a power node. Any number of nodes could be used in the power node system of FIG. 4, as the system is scalable from one to hundreds or thousands of parallel nodes 410a, 410b, 410c, etc. Each node 410a can include: a storage rack or other container configured to securely hold a control subsystem 100, a power subsystem 408, and a storage subsystem 434 that includes one or more batteries 406 which are removable and chargeable.

Thus, due to the modularity of the components in the node, there is a physical and logical separation, and independence of the components. Due to the scalability of the power system, there can be separate scaling of power and duration characteristics. Also, the size of the power system can be easily adapted based on project requirements and business changes. The modularity eliminates a single point of failure, and minimizes on site construction as the components can have plug and play capability.

The batteries 406 in the storage subsystem 434 can include batteries from different manufacturers or they can all be from the same manufacturer. Also, the batteries can all be of the same type (e.g. NiCd) or can be of different types. The storage subsystem 434 includes a battery management unit 404 including a computer processor 432 that is configured to monitor at least one battery of the one or more batteries 406 in the storage subsystem 434, and the battery management unit 404 is configured to communicate with the control subsystem 100. In an exemplary embodiment, the battery management unit 404 contains computer-based electronics and firmware responsible for safe charging/discharging of all batteries and communicates with the control subsystem 100.

In FIG. 4, the power subsystem 408 can be configured to be connected to a power line. For example, FIG. 5 shows that the power subsystem 408 is connected to, for example, a 400V AC line-to-line electrical system. The line-to-line electrical system could have any other voltage amount. The power subsystem 408 includes a power converter (e.g. an inverter) 416 which converts AC power to DC power when at least one battery 406 is being charged, and converts DC power to AC power when at least one battery is being discharged.

In FIGS. 4 and 5, the control subsystem 100 is connected to the storage subsystem 434 and is connected to the power subsystem 408. As shown in FIG. 2, the control subsystem 100 includes a processor 102, and the processor 102 is configured to control the transferring of power between the storage subsystem 434 and the power subsystem 408. FIG. 5 shows that the battery management unit 404 is electrically connected in between the power subsystem 408 and the battery modules 406.

In an exemplary embodiment, the processor 102 of the control subsystem 100 is configured to send signals which control the charging and discharging of at least one battery 406 located in the storage subsystem 434. Also, the processor 102 is configured to monitor an operational status of one or more batteries 406 located in the storage subsystem 434.

As shown in FIGS. 1 and 2, and described above, an exemplary embodiment of the control subsystem 100 includes: an AC/DC power supply 104; an uninterruptable power supply 106; a processor 102; an Ethernet switch 108; a first communication interface 216 configured to send and/or receive data from the storage subsystem 434; a first transfer interface 112 configured to transmit power to the storage subsystem 434; a second communication interface 218 configured to send and/or receive data from the power subsystem 408; and a second transfer interface 114 configured to transmit power to the power subsystem 408.

In an exemplary embodiment, the processor 102 receives battery data from the storage subsystem 434, and based on information in the received battery data, the processor 102 instructs the power subsystem 408 to control (for example, charge or discharge) the at least one battery 406. The battery data can be, for example, power status, charging/discharging status, battery charge status (e.g., percent of charge), AC contactor status, DC contactor status, fault/error status, etc. The battery data can also include any of the status/performance/health parameters that were described above.

In an exemplary embodiment, the processor 102 of the control subsystem 100 is configured to optimize health and performance of the one or more batteries 406 monitored/managed by the storage subsystem 434 by using the status/health/performance parameters described above.

A. Connections Among the Control Subsystem, the Power Subsystem, and the Storage Subsystem in a Node System FIG. 5 illustrates how the various components that make up a node can be (control subsystem 100, the power subsystem 408, and the storage subsystem 434) connected to each other. In FIG. 5, the protocols shown in the legend are exemplary. In FIG. 5, the control subsystem 100 is connected to the power subsystem 408 via three connections, for example. Two of the connections are 120V AC connections and one of the connections is an Ethernet connection that connects the Ethernet switch 108 of the control subsystem 100 to the inverter controller 416 of the power subsystem 408. One of the 120V AC connections is a connection between the uninterruptable power supply 106 and a 400V/120V transformer contained in the power subsystem 408. In addition to the transformer, the power subsystem 408 includes an AC contactor, and IGBT bridge and an inverter controller 416. In an exemplary embodiment, power to the uninterruptable power supply 106 does not have to come from the power subsystem 408.

The power subsystem 408 is connected to the storage subsystem 434 via two DC connections. The storage subsystem 434 also includes a DC contactor, a pre-charge relay, a battery management unit 404 (e.g. a computer processor), and an externally-accessible fuse/breaker. The power subsystem 408 is connected to the batteries 406 via DC connections. The power subsystem 408 can also be connected to one or more rack fans that are used to cool down the components if they are stored in a rack.

FIG. 5 also shows that the control subsystem 100 is connected to the storage subsystem 434 via an Ethernet connection. Specifically, the Ethernet switch 108 is connected to the battery management unit 404 of the storage subsystem 434. FIG. 5 also shows an emergency stop input line to which an emergency stop push-button switch can be connected. The emergency stop push-button switch can be mounted to an accessible location, and when it is pressed, causes power sources to be disconnected. For example, the power subsystem 408 can be disconnected from the storage subsystem 434 and from the energy storage facility AC bus.

3. Power Storage and Distribution System Hierarchy and Architecture

A. Multiple Nodes

FIG. 4 illustrates a power storage and distribution system 400 that includes more than one (e.g., three) nodes 410*a*, 410*b*, and 410*c*. Each of the nodes 410*a*, 410*b*, and 410*c* include, as described above: a storage rack configured to securely hold the control subsystem 100, the power subsystem 408, and the storage subsystem 434 including one or more batteries 406. The one or more batteries 406 are removable and chargeable. Thus, batteries can be easily changed when needed. The nodes can be stored in racks which can contain wheels or any other device that makes the rack-based nodes easily moveable. A node can be, for example, a 40 KW system. Also, each node can be of a divisible voltage that can be scalable. In other words, each node could have a same overall voltage level. It is also possible for the nodes to have different voltage levels.

B. Unit Control Subsystem/Subsystems

The power storage and distribution system 400 shown in FIG. 4 also includes a unit control subsystem 420 that is connected to each of the three nodes 410*a*, 410*b*, and 410*c*. In other words, the control subsystem 100 of each node 410*a*, 410*b*, 410*c* is connected to the unit control subsystem 420. The unit control subsystem 420 serves an arbitrary number of nodes. For example, the unit control subsystem 420 is configured to monitor a current state of the plurality of nodes 410*a*, 410*b*, 410*c* in the power storage and distribution system 400 shown in FIG. 4. The unit control subsystem 420 monitors/maintains, for example, the current state and charge/discharge capacity for the group of nodes it is assigned to cover. Any number of nodes can be used in the power storage and distribution system 400 shown in FIG. 4. Communications between the control subsystems 100 of nodes and the unit control subsystem 420 can be, for example, via Modbus or DNP3. Modbus is a serial communications protocol that is used to connect industrial electronic devices. Modbus allows for communication between many devices connected to the same network.

In the power storage and distribution system 400 of FIG. 4, the unit control subsystem 420 is configured to monitor a charge/discharge capacity of the plurality of nodes 410*a*, 410*b*, 410*c*, etc. The unit control subsystem 420 is also configured to optimize health and performance of the storage subsystems 434, the power subsystems 408, and/or the control subsystems 100 in the plurality of nodes 410*a*, 410*b*, 410*c*, etc. using, for example, the status/health/performance parameters described above. Also, the control subsystems 100 of each node can send a cost curve (e.g., Kilowatts vs. dollars) to the unit control subsystem 420, and the unit control subsystem 420 can determine which node is the cheapest resource to use, and use the power stored in the node that is the cheapest resource of power. In other words, the unit control subsystem 420 can bid between nodes in order to determine which node or nodes are the cheapest resource/resources of stored power. In an exemplary embodiment, the unit control subsystem 420 can rank the plurality of nodes based on their cost curve (e.g. cheapest to most expensive or most expensive to cheapest).

As described above, in each node 410*a*, 410*b*, 410*c*, the battery management unit 404 includes a processor 432 that is configured to monitor at least one battery 406, and is configured to communicate with the control subsystem 100. Also, in each node, the power subsystem 408 is configured to be connected to a power line, and the power subsystem 408 includes a power converter 416 (e.g. an inverter) which converts AC power to DC power when the at least one battery 406 is charged, and converts DC power to AC power when the at least one battery is discharged.

In each node 410*a*, 410*b*, 410*c*, the control subsystem 100 of the rack is connected to the storage subsystem 434 of the node and is connected to the power subsystem 408 of the node. The control subsystem 100 of the node includes a processor 102, and the processor 102 is configured to control transferring of power between the storage subsystem 434 and the power subsystem 408. In an exemplary embodiment, the processor 102 of the node is configured to send signals which control the charging and discharging of the at least one battery 406 in the node, and the processor 102 is configured to monitor an operational status of one or more batteries 406 in the node.

The power storage and distribution system 400 of FIG. 4 includes, for example, a frequency sensor 606, an RTU 422, and a supervisory control and data acquisition (SCADA) module 424 that is connected to the unit control subsystem 420. The frequency sensor 606 could be a voltage sensor, etc. The SCADA module 424 is a control system that performs data acquisition and is the primary user interface to the node control subsystems 410*d*, 410*e*, etc., the unit control subsystems 602*a*, 602*b*, etc., the site control subsystem 604, and a market dispatch unit. As shown in FIG. 4, SCADA module 424 can send and/or receive data from the power subsystem 408, the control subsystem 100 and the storage subsystem 434 of node 410*c*. SCADA module 424 can also send and/or receive data from all of the subsystems 100, 408, 434 in power nodes 410*a* and 410*b*. That is, the SCADA module 424 can talk toe each subsystem separately. The market dispatch unit contains market intelligence (e.g. power costs, etc.) and can make intelligent decisions based on market information pertaining to the energy industry. Communications between the unit control subsystem 420 and the RTU 422 and the SCADA module 424 can be, for example, via Modbus or DNP3. All data points of the site control subsystem 604, the unit control subsystems 420, 602*a*, 602*b*, 602*c*, and the node control subsystems 410*a*, 410*b*, 410*c* are available to the SCADA module 424.

The nodes 410*a*, 410*b*, 410*c* are connected to a switchgear 436 of, for example, 480V. Specifically, the switchgear 436 can be connected to the power subsystems 408 of the nodes 410*a*, 410*b*, 410*c*. In FIG. 4, the switchgear 436 is connected to an isolation transformer 426. The isolation transformer 426 is connected to a switchgear 428 of, for example, 13.8 kV. The switchgear 428 can also be connected to a generator step-up (GSU) transformer 430. The GSU transformer 430 can be for example, a 13.8/138 kV GSU transformer.

C. Site Control Subsystem

Figure 6:
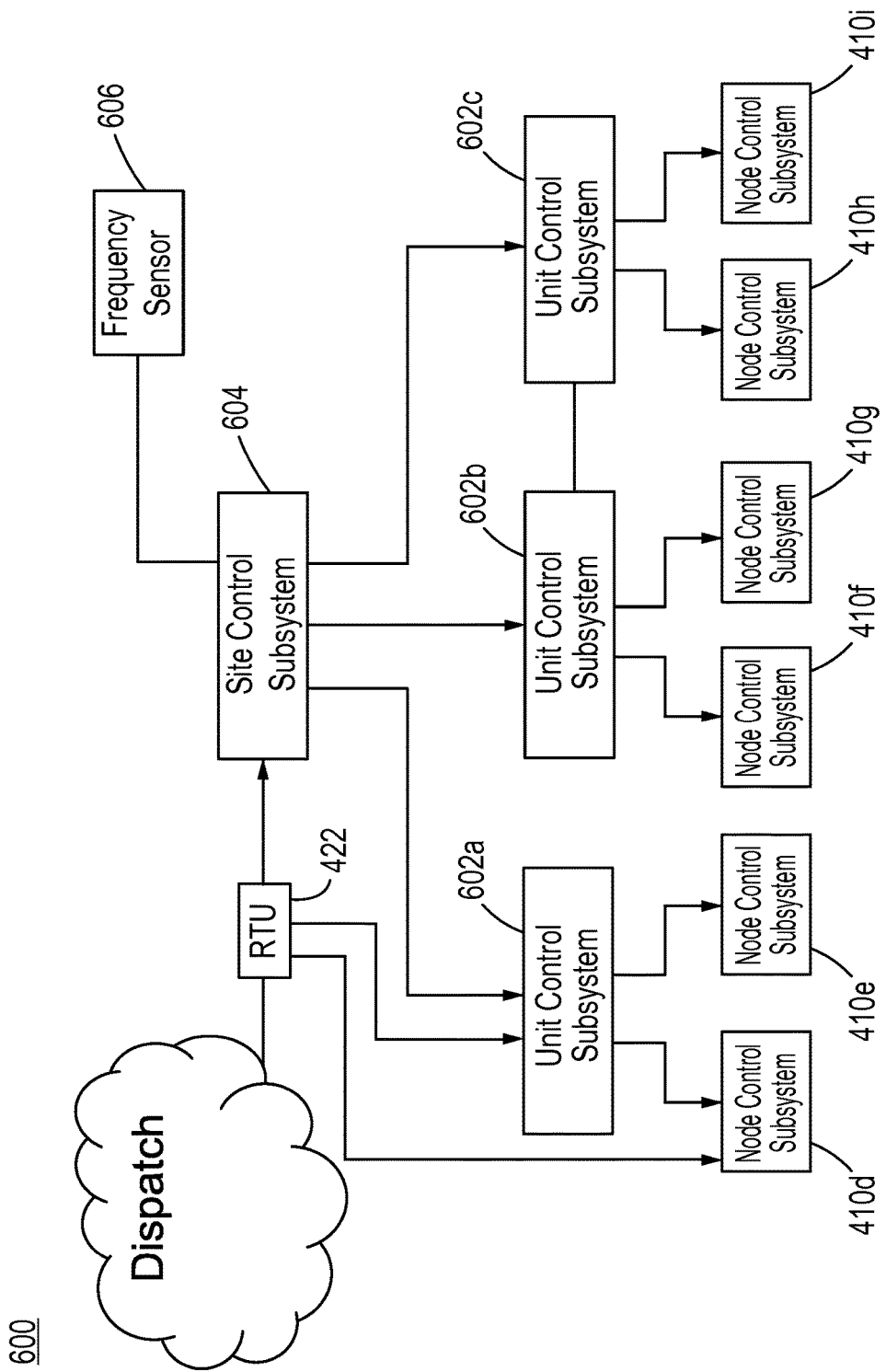
FIG. 6 illustrates a hierarchical architecture of a power system in accordance with an exemplary embodiment.

FIG. 6 illustrates a hierarchical architecture of a power system 600 that includes a plurality of unit control subsystems 602a, 602b, 602c, etc. Each unit control subsystem (for example, unit control subsystem 602a) is connected to multiple node control subsystems 410d and 410e that are control subsystems 100 located in nodes 410a, 410b, 410c. That is, a node control subsystem is a control subsystem 100 that is located in a node. For example, in FIG. 6, the node control subsystem 410d is located in a node that also includes a power subsystem 408, and a storage subsystem 434 including one or more batteries 406. Similarly, node control subsystem 410e is located in another node that also includes a power subsystem 408, and a storage subsystem 434 including one or more batteries 406. The unit control subsystem 602a is connected to the node control subsystems 410d and 410e. Similarly, unit control subsystem 602b is connected to the node control subsystems 410f and 410g. Also, unit control subsystem 602c is connected to the node control subsystems 410d and 410e.

Also, in the power system 600 of FIG. 6, a site control subsystem 604 is connected to each of the plurality of unit control subsystems 602a, 602b, 602c. The site control subsystem 604 can serve an arbitrary number of unit control subsystems. The site control subsystem 604 maintains/monitors the current state and the charge/discharge capacity for all of the nodes at the site, i.e. the power storage facility or portion of the power storage facility.

In FIG. 6, the site control subsystem 604 is configured to monitor a charge/discharge capacity of the plurality of unit control subsystems 602a, 602b, 602c. In addition, the site control subsystem 604 is configured to optimize and/or monitor health and performance of the components in the plurality of unit control subsystems 602a, 602b, 602c (batteries, inverters, etc.).

The power system 600 of FIG. 6 shows three unit control subsystems 602a, 602b, 602c, but the power system 600 could contain any number of unit control subsystems. The power system 600 of FIG. 6 shows six node control subsystems 410d, 410e, 410f, 410g, 410h, 410i, but the power system 600 could contain any number of node control subsystems. However, due to the hierarchical structure of the power system 600, typically there will be more node control subsystems than unit control subsystems as each unit control subsystem typically monitors more than one node control subsystem. For example, in FIG. 6, each unit control subsystem (e.g. 602a) monitors two node control subsystems (e.g. 410d and 410e). Due to the hierarchical structure of the power system of FIG. 6, the site control subsystem 604, or each site control subsystem 604, is connected to multiple unit control subsystems (e.g. 602a, 602b, 602c), and each unit control subsystem is connected to multiple node control subsystems. In an exemplary embodiment, as shown in FIG. 6, the site control subsystem can be connected to a frequency sensor 606, and the RTU 422 can be connected to the dispatch. The RTU 422 can send signals to the site control subsystem 604, the unit control subsystems 602a, 602b, 602c, etc., and the node control subsystems 410d, 410e, 410f, 410g, 410h, 410i, etc. Data from the frequency sensor 606 can be inputted to the site storage dispatch unit 604, and this data can be used in determining how to dispatch the site in addition to or instead of the dispatch shown in FIG. 6.

In an exemplary embodiment, the power system 600 can be self-registering. That is, each node control subsystem 410 stores a minimum set of information about itself that uniquely identifies the node. In other words, the node knows itself by storing information about itself in the control subsystem 100. The node can then register itself (i.e., it is self-registering) by sending the unique identification information to a unit control subsystem 602, and then up to the site control subsystem 604, etc. The unique identification information lets the site control subsystem 604 know that the node control subsystem that transmitted the information (e.g., identification information) is present and available. The site control subsystem 604 can then maintain a database of available node control subsystems.

Similarly, a unit control subsystem 602 also knows characteristics of itself and can register itself with the site control subsystem 604. Sites also know themselves and could register themselves with a fleet. Typically, a fleet is a geographical region. It is also possible for fleets to be nested. Similarly, fleets also know themselves and can register themselves with an enterprise, which can be the highest level in the hierarchy.

In an exemplary embodiment, the power system 600 can be self-assembling. The power system 600 is self-assembling in the respect that the nodes can decide that they are a unit, and units can decide that they are a site, etc. For example, each control subsystem 100 can store a preference profile which includes some or all of the following parameters pertaining to the node it is in (the unit control subsystems can also store preference profiles of multiple nodes it is assigned to monitor/manage and the site control subsystem can store preference profiles of a combined grouping of nodes that are monitored/managed by a unit control subsystem):

optimal charge/discharge rates of the batteries in the node;
most efficient dispatch range of the batteries, possible dispatch range of the batteries, current dispatch range of the batteries, etc.;
efficiency curve of the batteries;
current state/status of the node (e.g., whether it is online/offline, the current mode, errors that have occurred and/or are present, etc.);
power subsystem preferred operating temperature (e.g. minimum temperature, maximum temperature, etc.);
preferred battery temperature (e.g. minimum temperature, maximum temperature, etc.);
the maximum efficiency of the inverter;
history of the batteries (e.g., what have the batteries been doing over a recent time period, etc.);
throughput (e.g., average throughput);
warranty information of the batteries; and
life of the components, etc.

A plurality of nodes can then self-assemble to create a unit based on the required parameters of the system. Also, the site control subsystem 604 can select a specific grouping of nodes monitored by a particular unit control subsystem or select multiple groups of nodes monitored by two or more unit control subsystems based on the preference profiles of the nodes in order to obtain the required power characteristics that are required for the system.

In an exemplary embodiment, preference profile parameters described above could be weighted differently so that some parameters are deemed more important than others when selecting a node based upon its preference profile. For example, when a certain amount of power is needed, the site control subsystem 604 can start a bidding process by looking at the preference profiles of the multiple nodes in the system and select a node or a grouping of multiple nodes based on the power needed. For example, nodes can be selected that provide the cheapest amount of power. It is also possible that the selected nodes can be nodes which contain batteries that are just about to go out of warranty, nodes that are operating at maximum efficiency on their efficiency curve, nodes that are located close to each other (i.e., locality), etc.

In an exemplary embodiment, each node can contain individual software, and upon self-assembly to create a unit, the individual software of each node is combined to create a combined software program that can control all of the racks in the unit. Alternatively, one node in the unit can contain the software that is used to control all of the nodes of an assembled unit. Incorporated herein by reference in its entirety is Attorney Docket No. 0080451-000080 entitled "Method and System for Self-Registration and Self-Assembly of Electrical Devices," which further describes self-registration and self-assembly systems and methods which may be used in the modular energy storage methods and systems of the present application.

D. Human Machine Interface

The power system 600 of FIG. 6 can also include a human machine interface that can be connected to the power system 600 (for example, the SCADA module 424, the site control subsystem 604 of FIG. 6, or another component in the power system) in order to monitor and/or control the system. The human machine interface can be, for example, an application running on a tablet, computer, or smartphone. The human machine interface can output and display various parameters of the power system 600, for example, power, current, voltage, heartbeat, dispatch from rack to power subsystem, current state, etc.

In an exemplary embodiment, a system operator (e.g., via the human machine interface) sends dispatches which are received by the site control subsystem 604, and then are distributed among unit control subsystems (e.g., 602a, 602b, 602c, etc.) and node control subsystems (e.g., 410d, 410e, 410f, 410g, 410h, 410i, etc.). That is, there can be dispatches across nodes and across units (i.e., dispatch at node or unit level).

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A control subsystem configured to control transferring of power, comprising:
   an AC or DC power supply;
   an uninterruptable power supply;
   a processor;
   an Ethernet switch;
   a first communication interface configured to send and/or receive data from a storage subsystem that monitors one or more batteries;
   a first transfer interface configured to transmit power to the storage subsystem;
   a second communication interface configured to send and/or receive data from a power subsystem that includes a power converter, and the power subsystem is configured to be connected to a power line; and
   a second transfer interface configured to transmit power to the power subsystem,
   wherein the processor is configured to send signals which control the charging and discharging of at least one battery of the one or more batteries in the storage subsystem.

2. The control subsystem of claim 1, wherein the processor receives battery data from the storage subsystem, and based on information in the received battery data, the processor instructs the power subsystem to control the at least one battery.

3. The control subsystem of claim 1, wherein the processor is configured to optimize health and performance of the one or more batteries in the storage subsystem.

4. The control subsystem of claim 1, wherein the processor is configured to monitor an operational status of the one or more batteries.

5. The control subsystem of claim 1, wherein the control subsystem is configured to be mounted to a rack.

6. The control subsystem of claim 5, wherein the power subsystem and the storage subsystem are also configured to be mounted to the rack.

7. The control subsystem of claim 1, further comprising:
   a port that allows the processor to be programmed or reprogrammed.

8. The control subsystem of claim 1, further comprising:
   an indicator which indicates the status of the control subsystem and/or of an energy storage node.

9. The control subsystem of claim 1, further comprising:
   memory card interface configured to accept a removable memory card.

10. The control subsystem of claim 1, further comprising:
    a proximity sensor configured to sense a person or object in a vicinity of the control subsystem, and when a person or object is sensed in the vicinity of the control subsystem, the behavior of the control subsystem is modified.

11. The control subsystem of claim 1, wherein a housing of the control subsystem contains the AC/DC power supply, the processor, and the Ethernet switch, and the housing includes the first communication interface, the first transfer interface, the second communication interface, and the second transfer interface.

12. The control subsystem of claim 11, wherein the power subsystem has a housing separate from the housing of the control subsystem.

13. A power storage and distribution system, comprising:
    a node including:
       a storage subsystem, a control subsystem, and a power subsystem;
       the storage subsystem includes one or more batteries which are removable and chargeable and/or dischargeable, and the storage subsystem includes a processor that is configured to monitor at least one batten of the one or more batteries, and is configured to communicate with the control subsystem;
       the power subsystem is configured to be connected to a power line, and the power subsystem includes a power converter which converts AC power to DC power when the at least one battery is being charged, and converts DC power to AC power when the at least one battery is being discharged; and
       the control subsystem is connected to the storage subsystem and is connected to the power subsystem, the control subsystem includes a processor, and the processor is configured to control transferring of power between the storage subsystem and the power subsystem, and the control subsystem includes an uninterruptable power supply,
       wherein the processor is configured to send signals which control the charging and discharging of the at least one battery, and
       wherein the processor is configured to monitor an operational status of the one or more batteries.

14. The power storage and distribution system of claim 13, wherein the control subsystem includes:
an AC or DC power supply;
a processor;
an Ethernet switch;
a first communication interface configured to send and/or receive data from the storage subsystem;
a first transfer interface configured to transmit power to the storage subsystem;
a second communication interface configured to send and/or receive data from the power subsystem; and
a second transfer interface configured to transmit power to the power subsystem.

15. A power system comprising a plurality of nodes as defined in claim 13.

16. The power storage and distribution system of claim 13, wherein the processor receives battery data from the storage subsystem, and based on information in the received battery data and a request from a central or distributed control system, the processor instructs the power subsystem to control the at least one battery.

17. The power storage and distribution system of claim 13, wherein the processor is configured to optimize health and performance of the one or more batteries in the storage subsystem.

18. The power storage and distribution system of claim 13, further comprising a storage rack configured to securely hold the storage subsystem, the control subsystem, and the power subsystem, and the storage rack conforms to ETSI, EIA, IEC, CEA or DIN rack standards.

19. The power storage and distribution system of claim 13, further comprising:
a proximity sensor configured to sense a person or object in a vicinity of the node, and when a person or object is sensed in the vicinity of the node, the behavior of the node, control subsystem, storage subsystem, or power subsystem is modified.

20. A power storage and distribution system, comprising:
a plurality of nodes, each node including:
a storage subsystem, a control subsystem, and a power subsystem;
the storage subsystem includes one or more batteries which are removable and chargeable, and the storage subsystem includes a processor that is configured to monitor at least one battery of the one or more batteries, and is configured to communicate with the control subsystem;
the power subsystem is configured to be connected to a power line, and the power subsystem includes a power converter which converts AC power to DC power when the at least one battery is charged, and converts DC power to AC power when the at least one battery is discharged;
the control subsystem is connected to the storage subsystem and is connected to the power subsystem, the control subsystem includes a processor, and the processor is configured to control transferring of power between the storage subsystem and the power subsystem,
wherein the processor is configured to send signals which control the charging and discharging of the at least one battery, and
wherein the processor is configured to monitor an operational status of the one or more batteries; and
a unit control subsystem connected to each of the plurality of nodes, and the unit control subsystem is configured to monitor a current state of the plurality of nodes.

21. The power storage and distribution system of claim 20, wherein the unit control subsystem is configured to monitor a charge/discharge capacity of the plurality of nodes.

22. The power system of claim 21, wherein the site control subsystem is configured to optimize health and performance of components in the plurality of unit control subsystems.

23. The power storage and distribution system of claim 20, wherein the unit control subsystem is configured to optimize health and performance of the storage subsystems, the power subsystems, and the control subsystems in the plurality of nodes.

24. A power system comprising a plurality of unit control subsystems as defined in claim 20, wherein each unit control subsystem is connected to a plurality of nodes.

25. A power system comprising a site control subsystem connected to each of the plurality of unit control subsystems of claim 24.

26. The power system of claim 25, wherein the site control subsystem is configured to monitor a charge/discharge capacity of the plurality of unit control subsystems.

* * * * *